(12) United States Patent
Poirier et al.

(10) Patent No.: US 11,917,146 B2
(45) Date of Patent: Feb. 27, 2024

(54) METHODS AND APPARATUS FOR PICTURE ENCODING AND DECODING

(71) Applicant: InterDigital VC Holdings, Inc., Wilmington, DE (US)

(72) Inventors: Tangi Poirier, Thorigné-Fouillard (FR); Franck Galpin, Thorigne-Fouillard (FR); Fabrice Leleannec, Mouaze (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/498,392

(22) PCT Filed: Mar. 13, 2018

(86) PCT No.: PCT/EP2018/056254
§ 371 (c)(1),
(2) Date: Sep. 27, 2019

(87) PCT Pub. No.: WO2018/177741
PCT Pub. Date: Oct. 4, 2018

(65) Prior Publication Data
US 2020/0077094 A1    Mar. 5, 2020

(30) Foreign Application Priority Data
Mar. 27, 2017  (EP) .................... 17305347

(51) Int. Cl.
*H04N 19/119*    (2014.01)
*H04N 19/167*    (2014.01)
*H04N 19/176*    (2014.01)

(52) U.S. Cl.
CPC ......... *H04N 19/119* (2014.11); *H04N 19/167* (2014.11); *H04N 19/176* (2014.11)

(58) Field of Classification Search
CPC .. H04N 19/107; H04N 19/119; H04N 19/167; H04N 19/176
See application file for complete search history.

(56) References Cited

U.S. PATENT DOCUMENTS

RE47,243 E * 2/2019 Alshina .................. H04N 19/11
2010/0177821 A1* 7/2010 Kadoto ................ H04N 19/593
375/240.12

(Continued)

FOREIGN PATENT DOCUMENTS

AU  2012305071 A1  9/2012
CN   102640492 A   8/2012

(Continued)

OTHER PUBLICATIONS

Le Leannec, F., et al., "Asymmetric Coding Units in QTBT", Joint Video Exploration Team (JVET) of ITU-T SG 16 WP 3 and ISO/IEC JTC 1/SC 29/WG 11, 4th Meeting, Oct. 2016, pp. 1-8.

(Continued)

*Primary Examiner* — Jeremiah C Hallenbeck-Huber
(74) *Attorney, Agent, or Firm* — Klintworth & Rozenblat IP LLP

(57) ABSTRACT

A decoding method is disclosed that comprises: determining whether a current block of a picture extends beyond a boundary of the picture; determining for each split mode of a plurality of split modes whether said current block is allowed to undergo splitting according to said split mode by checking whether at least one of the split line is co-located with one of the picture border or whether the size of the block part inside the picture along the picture boundary is a multiple of a minimum block size; decoding from a bitstream a current split mode of the current block responsive to the allowed split modes; and decoding the current block according to the current split mode.

20 Claims, 9 Drawing Sheets

(56) References Cited

U.S. PATENT DOCUMENTS

| | | | |
|---|---|---|---|
| 2013/0034153 A1* | 2/2013 | Song | H04N 19/159 375/240.03 |
| 2013/0034154 A1* | 2/2013 | Song | H04N 19/13 375/240.03 |
| 2014/0119455 A1 | 5/2014 | Kobayashi | |
| 2015/0092862 A1* | 4/2015 | Yu | H04N 19/593 375/240.18 |
| 2015/0350566 A1* | 12/2015 | Hu | H04N 19/122 348/581 |
| 2016/0366404 A1 | 12/2016 | Takahashi et al. | |
| 2016/0373766 A1* | 12/2016 | Fuldseth | H04N 19/103 |
| 2019/0075328 A1* | 3/2019 | Huang | H04N 19/96 |
| 2019/0246106 A1* | 8/2019 | Park | H04N 19/167 |

FOREIGN PATENT DOCUMENTS

| | | |
|---|---|---|
| CN | 103491380 A | 1/2014 |
| CN | 104052996 A | 9/2014 |
| CN | 105959693 A | 9/2016 |
| EP | 3059708 B1 | 6/2018 |
| WO | WO 2016209757 A1 | 12/2016 |

OTHER PUBLICATIONS

Li, X., et al., "CTB splitting on frame boundary for arbitrary resolution video", Joint Collaborative Team on Video Coding (JCT-VC) of ITU-T SG16 WP3 and 1S0/IEC JTC1/SC29/WG11, 3rd Meeting, Oct. 2010, pp. 1-4.

Yang, F., et al., "Multi-Type-Tree", Joint Video Exploration Team (JVET) of ITU-T SG 16 WP 3 and 1S0/IEC JTC 1/SC 29/WG 11, 4th Meeting, Oct. 2016, pp. 1-3.

Chen, J., et al., "Algorithm Description of Joint Exploration Test Model 5 (JEM 5)", Joint Video Exploration Team (JVET) of ITU-T SG 16 WP 3 and ISO/IEC JTC 1/SC 29/WG 11, 5th Meeting, Jan. 2017, (44 pages).

Chen, Jianle. et al., "Algorithm Description of Joint Exploration Test Model 3", Joint Video Exploration Team (JVET) of ITU-T SG 16 WP 3 and ISO/IEC JTC 1/SC 29/WG 11, 3rd Meeting, 2016, pp. 1-37.

ITU-T "Series H: Audiovisual and Multimedia Systems: Infrastructure of audiovisual services—Coding of moving video." in ITU-T, sec. H 265.2, Oct. 2014, (12 pages).

* cited by examiner

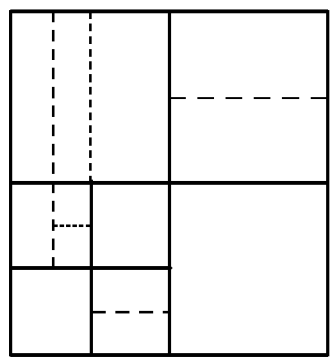
Figure 1 – Prior Art
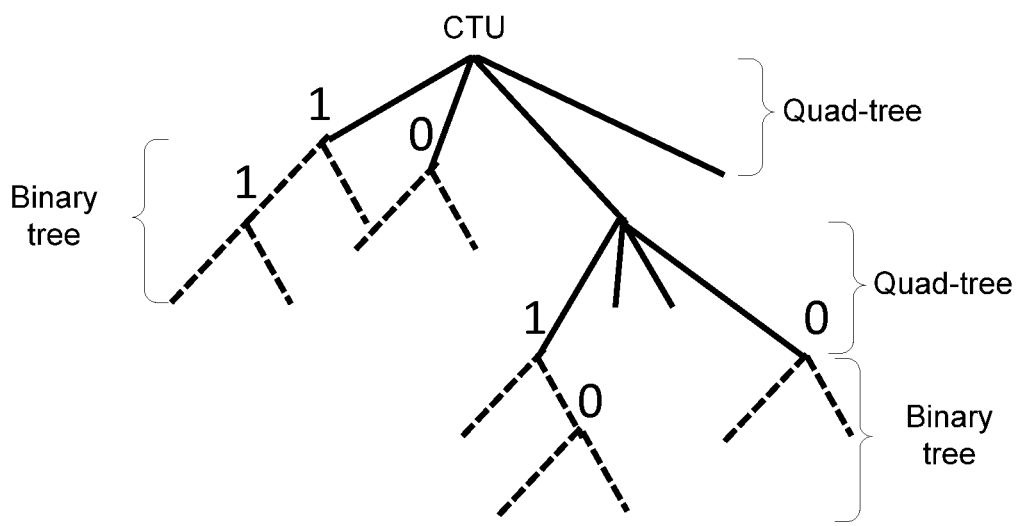
Figure 2 – Prior Art
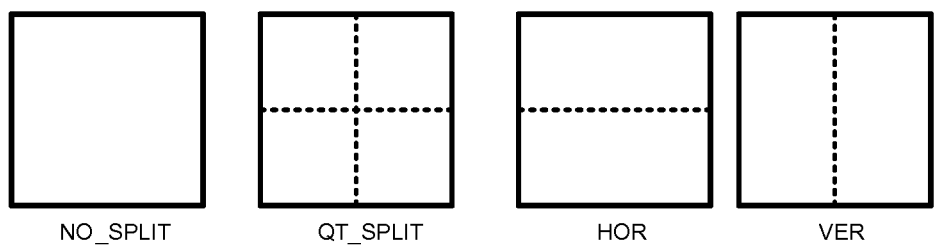
Figure 3 – Prior Art

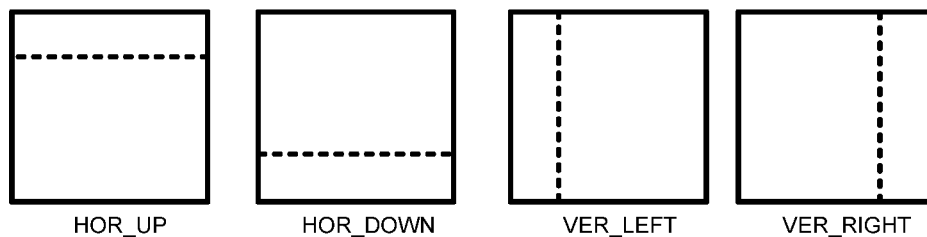
Figure 4 – Prior Art
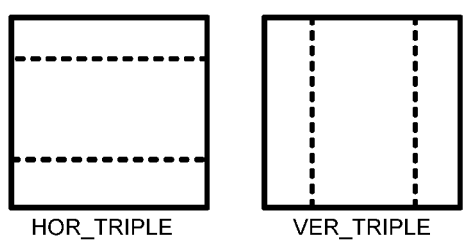
Figure 5 – Prior Art
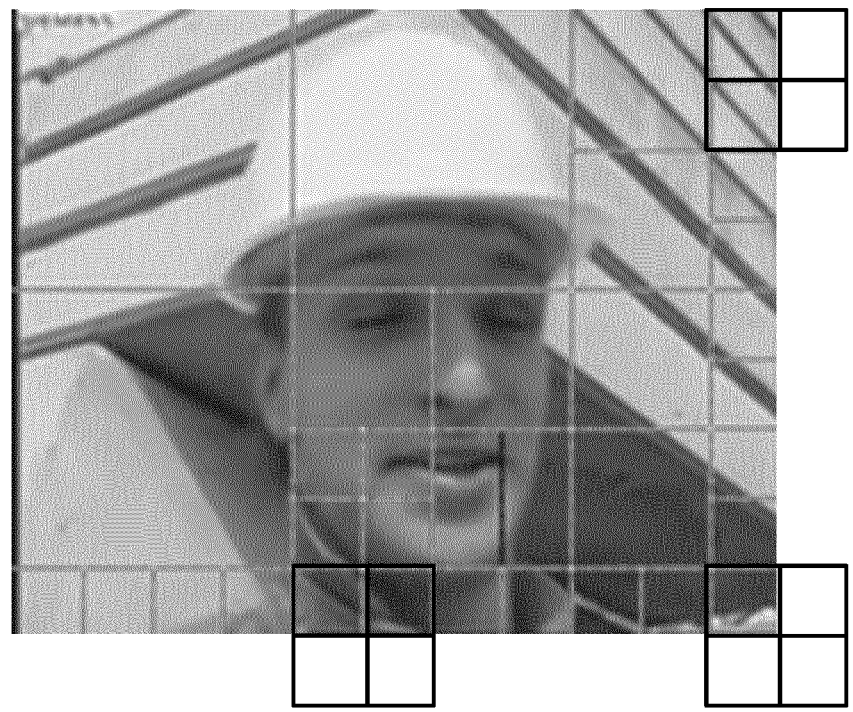
Figure 6

METHODS AND APPARATUS FOR PICTURE ENCODING AND DECODING

This application is a national stage application under 35 U.S.C. § 371 of International Application PCT/EP2018/056254, filed Mar. 13, 2018, which was published in accordance with PCT Article 21(2) on Oct. 4, 2018, in English, and which claims the benefit of European Patent Application No. 17305347.1, filed on Mar. 27, 2017.

1. TECHNICAL FIELD

The present principles generally relate to a method and an apparatus for picture encoding and decoding, and more particularly, to a method and an apparatus for picture block encoding and decoding at picture boundaries.

2. BACKGROUND ART

To achieve high compression efficiency, video coding schemes usually employ prediction and transform to leverage spatial and temporal redundancy in the video content. Generally, intra or inter prediction is used to exploit the intra or inter frame correlation, then the differences between the original image and the predicted image, often denoted as residuals, are transformed, quantized and entropy coded. To reconstruct the video, the compressed data is decoded by inverse processes corresponding to the prediction, transform, quantization and entropy coding.

In HEVC coding ("ITU-T H.265 Telecommunication standardization sector of ITU (10/2014), series H: audiovisual and multimedia systems, infrastructure of audiovisual services—coding of moving video, High efficiency video coding, Recommendation ITU-T H.265"), a picture is partitioned into coding tree units (CTU) of square shape with a configurable size typically 64×64, 128×128, or 256×256. A CTU is the root of a quad-tree partitioning into Coding Units (CU). For each CU, a prediction mode is signaled which indicates whether the CU is coded using intra or inter prediction. A Coding Unit is partitioned into one or more Prediction Units (PU) and forms the root of a quad-tree (known as transform tree) partitioning into Transform Units (TUs). A PU may have a square or a rectangular shape while a TU has a square shape. Each PU is assigned some prediction information, for instance motion information, spatial intra prediction, etc.

Quad-Tree plus Binary-Tree (QTBT) coding tool ("Algorithm Description of Joint Exploration Test Model 3", Document JVET-C1001_v3, Joint Video Exploration Team of ISO/IEC JTC1/SC29/WG11, 3rd meeting, 26 May-1 Jun. 2015, Geneva, CH) is a new video coding tool that provides a more flexible CTU representation than the CU/PU/TU arrangement of the HEVC standard. This coding tool was introduced in the Joint Exploration Model (JEM) which is the reference software for the Joint Video Exploration Team of ISO/IEC JTC1/SC29/WG11. The QTBT coding tool defines a coding tree where coding units can be split both in a quad-tree and in a binary-tree fashion. Such coding tree representation of a Coding Tree Unit is illustrated on FIG. 1, where solid lines indicate quad-tree partitioning and dotted lines indicate binary partitioning of a CU and further on FIG. 2. On FIG. 2, solid lines represent the quad-tree splitting and dotted lines represent the binary splitting that is spatially embedded in the quad-tree leaves. On this figure, a value 1 corresponds to a vertical binary split and a value 0 corresponds to an horizontal binary split.

The splitting of a CTU into coding units is decided on the encoder side, e.g. through a rate distortion optimization procedure which consists in determining the QTBT representation of the CTU with minimal rate distortion cost. In the QTBT representation, a CU has either a square or a rectangular shape. The size of a coding unit is always a power of 2, and typically goes from 4 to 128. The QTBT decomposition of a CTU comprises two stages: the CTU is first split into 4 CUs in a quad-tree fashion, then each quad-tree leaf can be further divided into two CUs in a binary fashion or into 4 CUs in a quad-tree fashion, as illustrated on FIG. 2.

With the QTBT representation, a CU is not further partitioned into PUs or TUs. In other words, once the partitioning of a CTU is decided, each CU is considered as a single prediction unit and a single transform unit. However, such a QTBT representation only allows for symmetric splitting of a CU as illustrated by FIG. 3. FIG. 3 depicts 4 split modes allowed by QTBT. The mode NO_SPLIT indicates that the CU is not further split. The mode QT_SPLIT indicates that the CU is split into 4 quadrants according to a quad-tree, the quadrants being separated by two split lines. The mode HOR indicates that the CU is split horizontally into two CUs of equal size separated by one split line. VER indicates that the CU is split vertically into two CUs of equal size separated by one split line. The split lines are represented by dashed lines on FIG. 3. In "Asymmetric Coding Units in QTBT", Document: JVET-D0064, Joint Video Exploration Team (JVET) of ITU-T SG16 WP3 and ISO/IEC JTC1/SC29/WG11, 4th Meeting: Chengdu, CN, 15-21 Oct. 2016, new asymmetric split modes are introduced in QTBT. A CU may thus be split horizontally into two coding units with respective rectangular sizes (w,h/4) and (w,3h/4) or vertically into two coding units with respective rectangular sizes (w/4,h) and (3w/4,h)) depicted on FIG. 4. Furthermore, a CU with a size multiple of 3 in width or height can be further split in a binary fashion horizontally or vertically, provided the size is even. The two coding units are separated by one split line represented by dashed line on FIG. 4.

In "Multi-Type-Tree", Document: JVET-D0117-r1, Joint Video Exploration Team (JVET) of ITU-T SG16 WP3 and ISO/IEC JTC1/SC29/WG11, 4th Meeting: Chengdu, CN, 15-21 Oct. 2016, new triple split mode are introduced. A CU may thus be split horizontally into three coding units with respective rectangular sizes (w,h/4), (w, h/2) and (w, h/4) or vertically into three coding units with respective rectangular sizes (w/4,h), (w/2, h) and (w/4, h) as depicted on FIG. 5. The three coding units are separated by two split lines represented by dashed lines on FIG. 5.

In HEVC and JEM, most of these modes are disallowed for the blocks located at the border of the picture which are thus not coded efficiently.

3. BRIEF SUMMARY

A decoding method for decoding a current block, the current block including at least a portion of a picture, is disclosed that comprises:
   determining whether the current block extends beyond a boundary of the picture;
   determining for each split mode of a plurality of split modes whether the split mode is allowed for the current block by checking whether at least one of the split lines is co-located with one of the picture boundaries or whether a size of a block part, i.e. a remaining part resulting from the splitting, inside the picture along the picture boundary is a multiple of a minimum block size;

decoding from a bitstream a current split mode of the current block responsive to the allowed split modes; and decoding the current block according to the current split mode.

A decoding apparatus configured to decode a current block, the current block including at least a portion of a picture, is disclosed that comprises:

means for determining whether the current block extends beyond a boundary of the picture;

means for determining for each split mode of a plurality of split modes whether the split mode is allowed for the current block by checking whether at least one of the split lines is co-located with one of the picture boundaries or whether a size of a block part inside the picture along the picture boundary is a multiple of a minimum block size;

means for decoding from a bitstream a current split mode of the current block responsive to the allowed split modes; and means for decoding the current block according to the current split mode.

A decoding apparatus is disclosed that comprises a communication interface configured to access at least a bitstream and at least one processor configured to:

determine whether a current block extends beyond a boundary of the picture, wherein the current block includes at least a portion of a picture;

determine for each split mode of a plurality of split modes whether the split mode is allowed for the current block by checking whether at least one of the split lines is co-located with one of the picture boundaries or whether a size of a block part inside the picture along the picture boundary is a multiple of a minimum block size;

decode from the accessed bitstream a current split mode of the current block responsive to the allowed split modes; and decode the current block according to the current split mode.

The following embodiments apply to the decoding method and decoding apparatus disclosed above.

According to a specific embodiment, the plurality of split modes comprises at least two of the following split modes, herein h is the height of the current block and w is the width of the current block:

splitting the block horizontally into one upper sub-block of height h/4 and one bottom sub-block of height 3h/4;

splitting the block horizontally into one bottom sub-block of height h/4 and one upper sub-block of height 3h/4;

splitting the block vertically into one left sub-block of width w/4 and one right sub-block of width 3w/4;

splitting the block vertically into one right sub-block of width w/4 and one left sub-block of width 3w/4;

splitting the block horizontally into one sub-block of height h/4, one central sub-block of height h/2 and one sub-block of height h/4;

splitting the block vertically into one sub-block of width w/4, one central sub-block of width w/2 and one sub-block of width w/4;

splitting the block horizontally into two sub-blocks of height h/2; and splitting the block vertically into two sub-blocks of width w/2.

According to a specific characteristic, the minimum block size in at least one of height and width is equal to 4.

An encoding method for encoding a current block, the current block including at least a portion of a picture, is disclosed that comprises:

determining whether the current block extends beyond a boundary of the picture;

determining, for each split mode of a plurality of split modes, whether the split mode is allowed for the current block by checking whether at least one of the split lines is co-located with one of the picture boundaries or whether a size of a block part inside the picture along the picture boundary is a multiple of a minimum block size;

encoding in a bitstream a current split mode of the current block determined responsive to the allowed split modes; and encoding the current block in the bitstream according to the current split mode.

An encoding apparatus configured to encode a current block, the current block including at least a portion of a picture, is disclosed that comprises :

means for determining whether the current block extends beyond a boundary of the picture;

means for determining, for each split mode of a plurality of split modes, whether the split mode is allowed for the current block by checking whether at least one of the split lines is co-located with one of the picture boundaries or whether a size of a block part inside the picture along the picture boundary is a multiple of a minimum block size;

means for encoding in a bitstream a current split mode of the current block determined responsive to the allowed split modes; and means for encoding the current block in the bitstream according to the current split mode.

An encoding apparatus comprising a communication interface configured to access at least a current block, the current block including at least a portion of a picture, is disclosed. The encoding apparatus further comprises at least one processor configured to:

determine whether the accessed current block extends beyond a boundary of the picture;

determine, for each split mode of a plurality of split modes, whether the split mode is allowed for the current block by checking whether at least one of the split lines is co-located with one of the picture boundaries or whether a size of a block part inside the picture along the picture boundary is a multiple of a minimum block size;

encode in a bitstream a current split mode of the current block determined responsive to the allowed split modes; and encode the accessed current block in the bitstream according to the current split mode.

A bitstream is disclosed that comprises:

coded data representative of a current split mode of a current block determined responsive to allowed split modes, the current block including at least a portion of a picture;

coded data representative of the current block encoded according to a current split mode;

wherein the allowed split modes are determined by:

determining whether the current block extends beyond a boundary of the picture;

determining, for each split mode of a plurality of split modes, whether the split mode is allowed for the current block by checking whether at least one of the split lines is co-located with one of the picture boundaries or whether a size of a block part inside the picture along the picture boundary is a multiple of a minimum block size.

A non-transitory processor readable medium having stored thereon a bitstream comprising:
coded data representative of a current split mode of a current block determined responsive to allowed split modes, the current block including at least a portion of a picture;
coded data representative of the current block encoded according to a current split mode;
wherein the allowed split modes are determined by:
determining whether the current block extends beyond a boundary of the picture;
determining, for each split mode of a plurality of split modes, whether the split mode is allowed for the current block by checking whether at least one of the split lines is co-located with one of the picture boundaries or whether a size of a block part inside the picture along the picture boundary is a multiple of a minimum block size.

Transmitting method and apparatus for transmitting the above bitstream are also disclosed.

The following embodiments apply to the coding method, coding apparatus, bitstream, processor readable medium, transmitting method and transmitting apparatus disclosed above.

The plurality of split modes comprises at least two of the following split modes wherein h is the height of the current block and w is the width of the current block:
splitting the block horizontally into one upper sub-block of height h/4 and one bottom sub-block of height 3h/4;
splitting the block horizontally into one bottom sub-block of height h/4 and one upper sub-block of height 3h/4;
splitting the block vertically into one left sub-block of width w/4 and one right sub-block of width 3w/4;
splitting the block vertically into one right sub-block of width w/4 and one left sub-block of width 3w/4;
splitting the block horizontally into one sub-block of height h/4, one central sub-block of height h/2 and one sub-block of height h/4;
splitting the block vertically into one sub-block of width w/4, one central sub-block of width w/2 and one sub-block of width w/4;
splitting the block horizontally into two sub-blocks of height h/2; and
splitting the block vertically into two sub-blocks of width w/2.

According to a specific characteristic, the minimum block size in at least one of height and width is equal to 4.

4. BRIEF SUMMARY OF THE DRAWINGS

FIG. 1 represents a coding tree unit divided into smaller coding units according to various split modes;

FIG. 2 represents in the form of a tree the splitting of the coding tree unit of FIG. 1;

FIG. 3 illustrates the symmetric binary split modes in addition to the quad-tree and no split modes;

FIG. 4 illustrates the asymmetric split modes;

FIG. 5 illustrates the symmetric triple split modes;

FIG. 6 represents blocks split by a quad-tree that extends beyond the picture boundaries;

5. DETAILED DESCRIPTION

Figure 7:
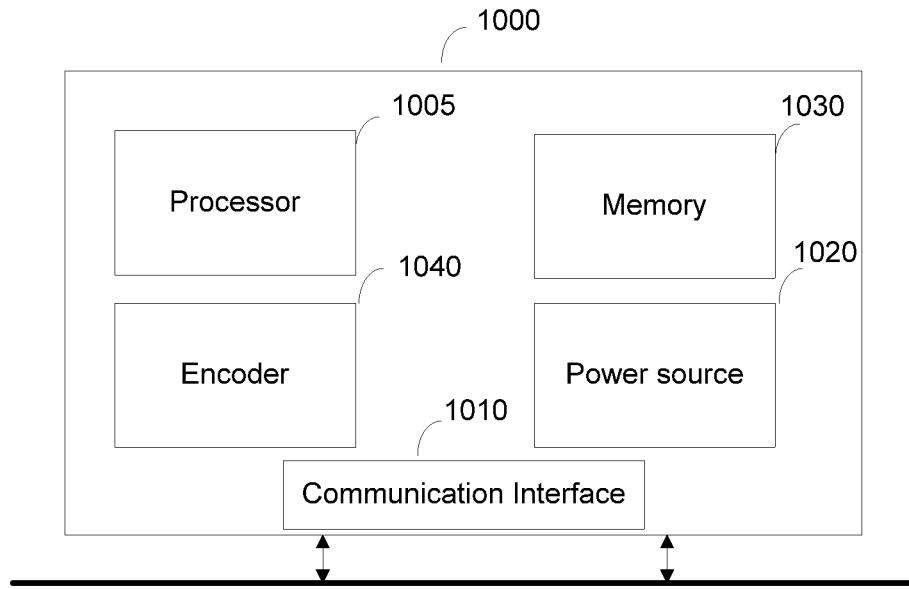
FIG. 7 represents an exemplary architecture of a transmitter configured to encode a picture in a bitstream according to a specific and non-limiting embodiment.

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

A picture is an array of luma samples in monochrome format or an array of luma samples and two corresponding arrays of chroma samples in 4:2:0, 4:2:2, and 4:4:4 colour format. Generally, a "block" addresses a specific area in a sample array (e.g., luma Y), and a "unit" includes the collocated block of all color components (luma Y and possibly chroma Cb and chroma Cr). A slice is an integer number of basic coding units such as HEVC coding tree units or H.264 macroblock units. A slice may consist of a complete picture as well as part thereof. Each slice may include one or more slice segments.

In the following, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of various sizes. JEM does not distinguish between CU, PU and TU since a CU is a block of samples on which a same transform and prediction information is applied. A CU may be split into several coding units according to a split mode. The lines separating coding units in a larger coding unit are called split lines.

In the following, the word "reconstructed" and "decoded" can be used interchangeably. Usually but not necessarily "reconstructed" is used on the encoder side while "decoded" is used on the decoder side. It should be noted that the term "decoded" or "reconstructed" may mean that a bitstream is partially "decoded" or "reconstructed," for example, the signals obtained after deblocking filtering but before SAO filtering, and the reconstructed samples may be different from the final decoded output that is used for display. We may also use the terms "image," "picture," and "frame" interchangeably. We may use the terms "border" and "boundary" interchangeably.

Various embodiments are described with respect to the HEVC standard. However, the present principles are not limited to HEVC, and can be applied to other standards, recommendations, and extensions thereof, including for example HEVC or HEVC extensions like Format Range (RExt), Scalability (SHVC), Multi-View (MV-HEVC) Extensions and H.266. The various embodiments are described with respect to the encoding/decoding of a slice. They may be applied to encode/decode a whole picture or a whole sequence of pictures.

Various methods are described above, and each of the methods comprises one or more steps or actions for achieving the described method. Unless a specific order of steps or actions is required for proper operation of the method, the order and/or use of specific steps and/or actions may be modified or combined.

Allowing the new split modes depicted on FIGS. 3, 4 and 5 may dramatically increase the signaling cost. There is thus a need to improve the syntax without decreasing the quality of the reconstructed pictures. The blocks that are completely inside the picture may use all types of split modes. However, for the blocks located on the boundaries/borders of the picture especially at the right and at the bottom boundaries of the picture (in case of classical raster scan order or Z-scan) some of the split modes may be disallowed especially if the block extends outside the picture. In HEVC and JEM, in the case where a block is extends partly outside the picture, the block is necessarily split according to a quad-tree as depicted on FIG. 6. In this case, there is no need to signal the split mode since a single split mode is allowed for these blocks that are partly outside the picture. Indeed, once a block is determined to extend partly outside the picture, then the split mode for this block is inferred to be a quad-tree split (e.g. QT_SPLIT). However, by inferring the split mode to be a quad-tree split, the quality of the reconstructed block at the boundaries of the picture may decrease since the number of split modes to encode the block is drastically limited. In addition, such a method requires the width and height of the picture to be a multiple of the minimum coding block size (typically 4 pixels) to ensure that a border of a picture is reached by successive quad-tree splits. In case of multiple tiles or slices in a frame, same issue will occur at the boundaries of the tiles/slices. This could lead to similar quality issues at the border of the tiles/slices, and especially if used with some layout for 360° videos.

FIG. 7 represents an exemplary architecture of a transmitter 1000 configured to encode a picture in a bitstream according to a specific and non-limiting embodiment.

The transmitter 1000 comprises one or more processor(s) 1005, which could comprise, for example, a CPU, a GPU and/or a DSP (English acronym of Digital Signal Processor), along with internal memory 1030 (e.g. RAM, ROM, and/or EPROM). The transmitter 1000 comprises one or more communication interface(s) 1010 (e.g. a keyboard, a mouse, a touchpad, a webcam), each adapted to display output information and/or allow a user to enter commands and/or data; and a power source 1020 which may be external to the transmitter 1000. The transmitter 1000 may also comprise one or more network interface(s) (not shown). Encoder module 1040 represents the module that may be included in a device to perform the coding functions. Additionally, encoder module 1040 may be implemented as a separate element of the transmitter 1000 or may be incorporated within processor(s) 1005 as a combination of hardware and software as known to those skilled in the art.

The picture may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- a picture capturing circuit (e.g. a sensor such as, for example, a CCD (or Charge-Coupled Device) or CMOS (or Complementary Metal-Oxide-Semiconductor)).

According to different embodiments, the bitstream may be sent to a destination. As an example, the bitstream is stored in a remote or in a local memory, e.g. a video memory or a RAM, a hard disk. In a variant, the bitstream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the transmitter 1000 further comprises a computer program stored in the memory 1030. The computer program comprises instructions which, when executed by the transmitter 1000, in particular by the processor 1005, enable the transmitter 1000 to execute the encoding method described with reference to FIG. 17. According to a variant, the computer program is stored externally to the transmitter 1000 on a non-transitory digital data support, e.g. on an external storage medium such as a HDD, CD-ROM, DVD, a read-only and/or DVD drive and/or a DVD Read/Write drive, all known in the art. The transmitter 1000 thus comprises a mechanism to read the computer program. Further, the transmitter 1000 could access one or more Universal Serial Bus (USB)-type storage devices (e.g., "memory sticks.") through corresponding USB ports (not shown).

According to exemplary and non-limiting embodiments, the transmitter 1000 can be, but is not limited to:
- a mobile device;
- a communication device;
- a game device;
- a tablet (or tablet computer);
- a laptop;
- a still picture camera;
- a video camera;
- an encoding chip or encoding device/apparatus;
- a still picture server; and
- a video server (e.g. a broadcast server, a video-on-demand server or a web server).

Figure 8:
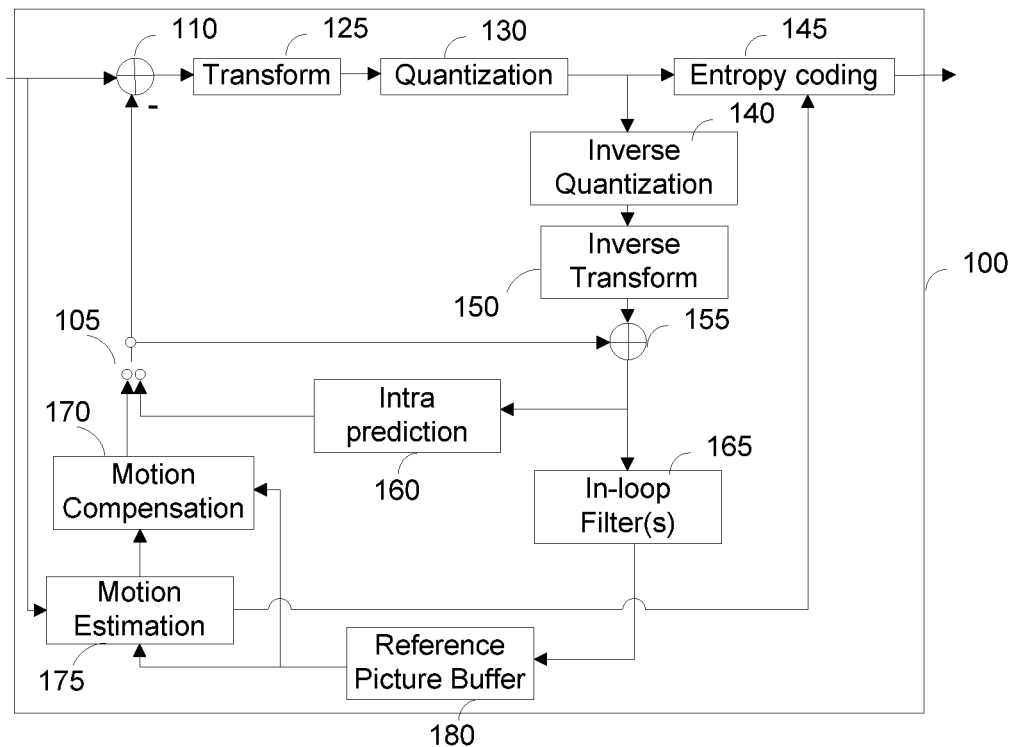
FIG. 8 illustrates an exemplary video encoder according to a specific and non-limiting embodiment.
Figure 17:
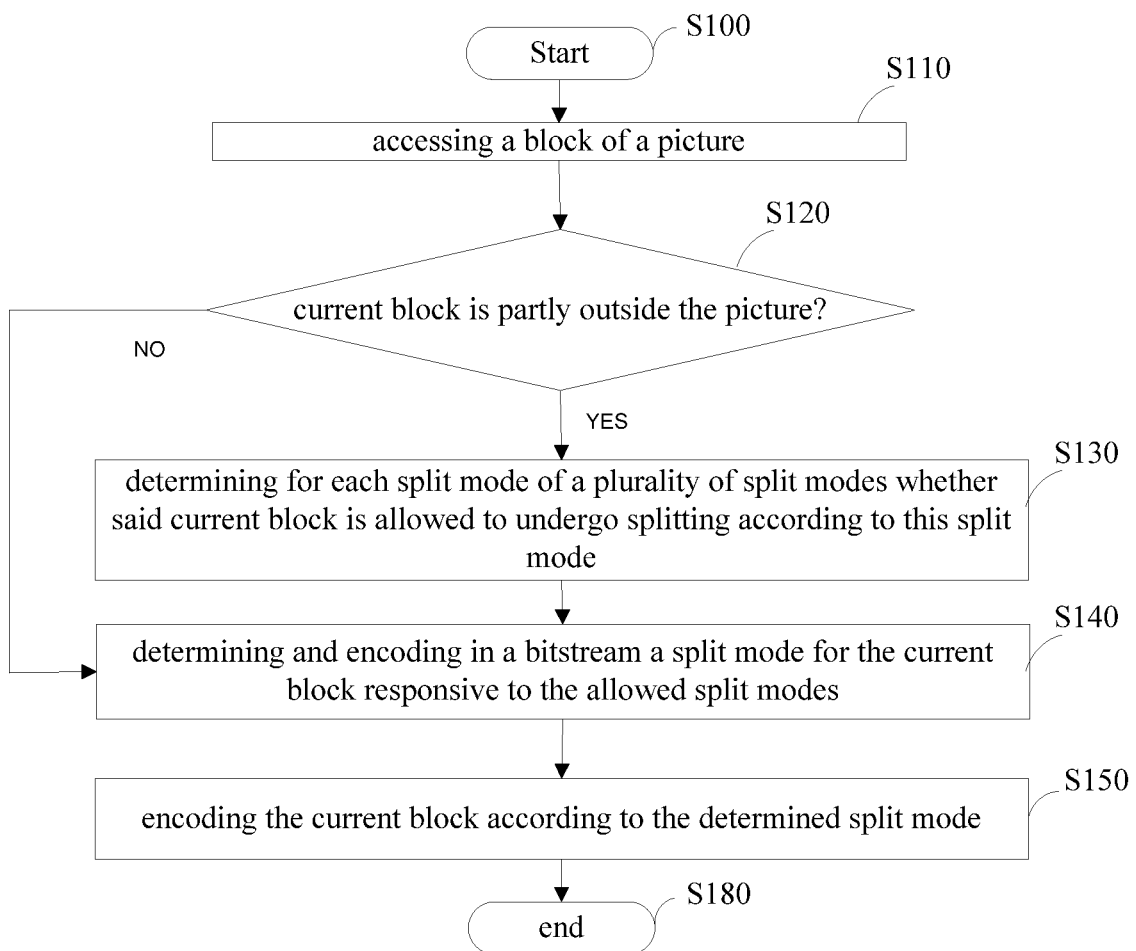
FIG. 17 represents a flowchart of a method for encoding a block of a picture in a bitstream according to a specific and non-limiting embodiment.

FIG. 8 illustrates an exemplary video encoder 100, e.g. a HEVC video encoder or encoder of the JEM type, adapted to execute the encoding method of FIG. 17. The encoder 100 is an example of a transmitter 1000 or part of such a transmitter 1000.

For coding, a picture is usually partitioned into basic coding units, e.g. into coding tree units (CTU) in HEVC or into macroblock units in H.264. A set of possibly consecutive basic coding units is grouped into a slice. A basic coding unit contains the basic coding blocks of all color components. In HEVC, the smallest CTB size 16×16 corresponds to a macroblock size as used in previous video coding standards. It will be understood that, although the terms CTU and CTB are used herein to describe encoding/decoding methods and encoding/decoding apparatus, these methods and apparatus should not be limited by these specific terms that may be worded differently (e.g. macroblock) in other standards such as H.264.

In the exemplary encoder 100, a picture is encoded by the encoder elements as described below. The picture to be encoded is processed in units of CUs that may be square as in HEVC or rectangular as in JEM. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Residuals are calculated by subtracting (110) a predicted sample block (also known as a predictor) from the original picture block.

CUs in intra mode may be predicted from reconstructed neighboring samples within the same slice. A set of 35 intra prediction modes is available in HEVC, including a DC, a planar and 33 angular prediction modes. The intra prediction reference is reconstructed from the row and column adjacent to the current block.

For an inter CU, the corresponding coding block may be further partitioned into one or more prediction blocks as in HEVC. Inter prediction is performed on the PB level, and the corresponding PU contains the information about how inter prediction is performed.

The residuals are transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder comprises a decoding loop and thus decodes an encoded block to provide a reference for further predictions. The quantized transform coefficients are de-quantized (140) and inverse transformed (150) to decode residuals. A picture block is reconstructed by combining (155) the decoded residuals and the predicted sample block. An in-loop filter (165) is applied to the reconstructed picture, for example, to perform deblocking/SAO (Sample Adaptive Offset) filtering to reduce coding artifacts. The filtered picture may be stored in a reference picture buffer (180) and used as reference for other pictures.

Figure 9:
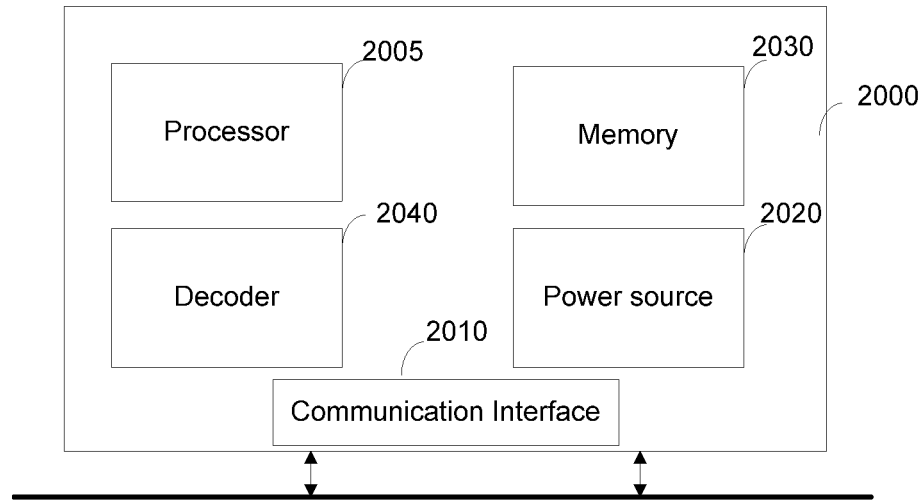
FIG. 9 represents an exemplary architecture of a receiver configured to decode a picture in a bitstream according to a specific and non-limiting embodiment.

FIG. 9 represents an exemplary architecture of a receiver 2000 configured to decode a picture from a bitstream to obtain a decoded picture according to a specific and non-limiting embodiment.

The receiver 2000 comprises one or more processor(s) 2005, which could comprise, for example, a CPU, a GPU and/or a DSP (English acronym of Digital Signal Processor), along with internal memory 2030 (e.g. RAM, ROM and/or EPROM). The receiver 2000 comprises one or more communication interface(s) 2010 (e.g. a keyboard, a mouse, a touchpad, a webcam), each adapted to display output information and/or allow a user to enter commands and/or data (e.g. the decoded picture); and a power source 2020 which may be external to the receiver 2000. The receiver 2000 may also comprise one or more network interface(s) (not shown). The decoder module 2040 represents the module that may be included in a device to perform the decoding functions. Additionally, the decoder module 2040 may be implemented as a separate element of the receiver 2000 or may be incorporated within processor(s) 2005 as a combination of hardware and software as known to those skilled in the art.

The bitstream may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the decoded picture may be sent to a destination, e.g. a display device. As an example, the decoded picture is stored in a remote or in a local memory, e.g. a video memory or a RAM, a hard disk. In a variant, the decoded picture is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to a specific and non-limiting embodiment, the receiver 2000 further comprises a computer program stored in the memory 2030. The computer program comprises instructions which, when executed by the receiver 2000, in particular by the processor 2005, enable the receiver to execute the decoding method described with reference to FIG. 11. According to a variant, the computer program is stored externally to the receiver 2000 on a non-transitory digital data support, e.g. on an external storage medium such as a HDD, CD-ROM, DVD, a read-only and/or DVD drive and/or a DVD Read/Write drive, all known in the art. The receiver 2000 thus comprises a mechanism to read the computer program. Further, the receiver 2000 could access one or more Universal Serial Bus (USB)-type storage devices (e.g., "memory sticks.") through corresponding USB ports (not shown).

According to exemplary and non-limiting embodiments, the receiver 2000 can be, but is not limited to:
- a mobile device;
- a communication device;
- a game device;
- a set top box;
- a TV set;
- a tablet (or tablet computer);
- a laptop;
- a video player, e.g. a Blu-ray player, a DVD player;
- a display; and
- a decoding chip or decoding device/apparatus.

Figure 10:
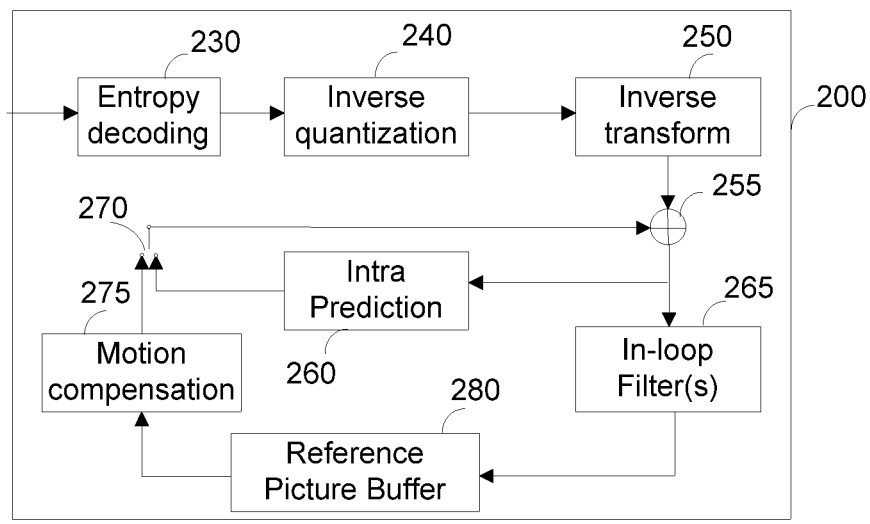
FIG. 10 illustrates an exemplary video decoder according to a specific and non-limiting embodiment.
Figure 11:
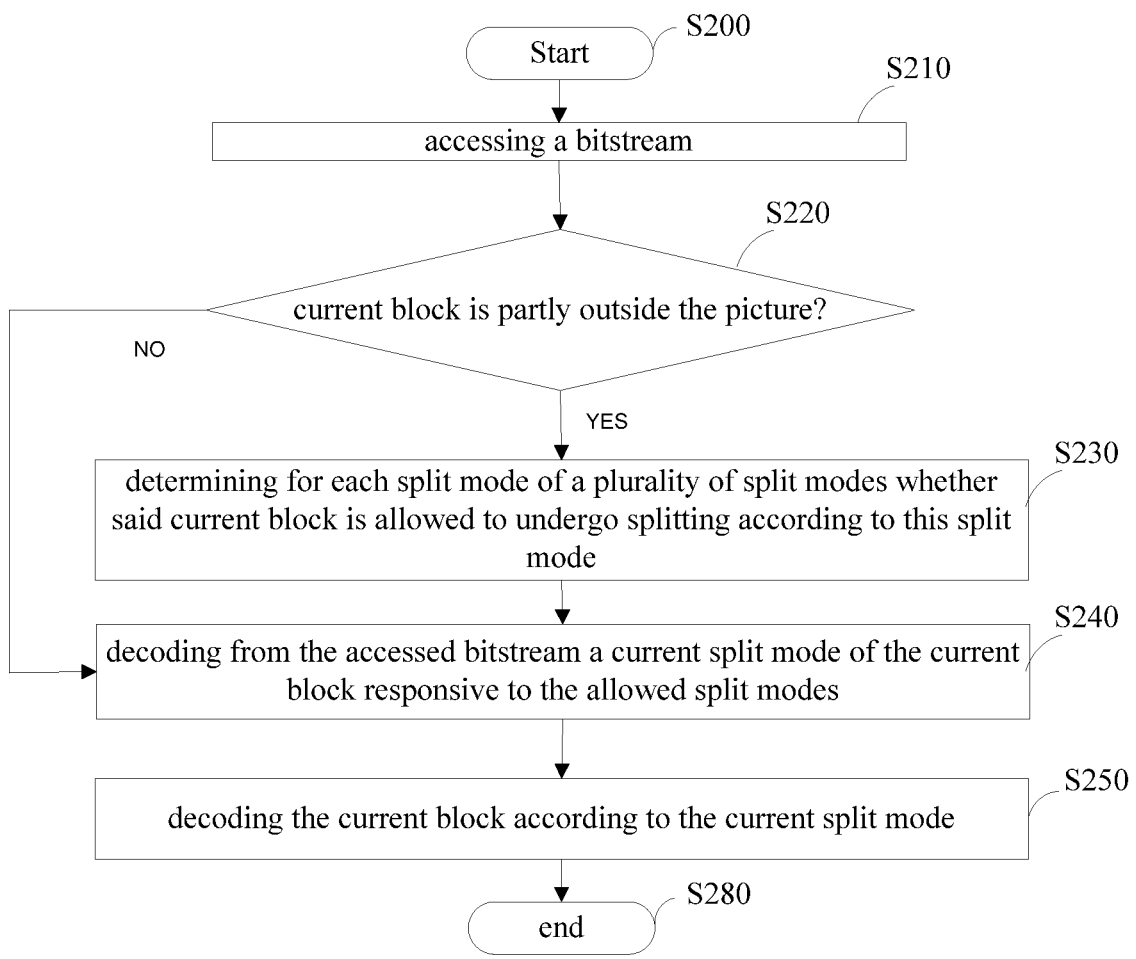
FIG. 11 represents a flowchart of a method for decoding a block of a picture from a bitstream according to a specific and non-limiting embodiment.

FIG. 10 illustrates a block diagram of an exemplary video decoder 200, e.g. an HEVC video decoder or a decoder of the JEM type, adapted to execute the decoding method of FIG. 11. The video decoder 200 is an example of a receiver 2000 or part of such a receiver 2000. In the exemplary decoder 200, a bitstream is decoded by the decoder elements as described below. Video decoder 200 generally performs a decoding pass reciprocal to the encoding pass as described in FIG. 8, which performs video decoding as part of encoding video data.

In particular, the input of the decoder includes a video bitstream, which may be generated by the video encoder 100. The bitstream is first entropy decoded (230) to obtain transform coefficients, motion vectors, and other coded information. The transform coefficients are de-quantized (240) and inverse transformed (250) to decode residuals. The decoded residuals are then combined (255) with a predicted sample block (also known as a predictor) to obtain a decoded/reconstructed picture block. The predicted sample block may be obtained (270) from intra prediction (260) or motion-compensated prediction (i.e., inter prediction) (275). An in-loop filter (265) is applied to the reconstructed picture. The in-loop filter may comprise a deblocking filter and a SAO filter. The filtered picture is stored at a reference picture buffer (280).

FIG. 11 represents a flowchart of a method for decoding a current block from a bitstream according to a specific and non-limiting embodiment, wherein the current block includes at least a portion of a picture.

The method starts at step S200. At step S210, a receiver 2000 such as the decoder 200 accesses a bitstream.

At step S220, the receiver determines whether a current block to be decoded is partly outside the picture, i.e. extends beyond one boundary of the picture. This may be determined by computing Diff_X and Diff_Y as follows:

$$\text{Diff}\_X = \text{blkPosX} + \text{width} - \text{frameWidth; and}$$

$$\text{Diff}\_Y = \text{blkPosY} + \text{height} - \text{frameHeight}$$

where blkPosX is the position of the current block in X, e.g. coordinate in X of the top left pixel of the block, and blkPosY is the position of the current block in Y, e.g. coordinate in Y of the top left pixel of the block, width is the block width, height is the block height, frameWidth is the picture width and frameHeight is the picture height. If Diff_X<=0 and Diff_Y<=0, then the block is completely inside the picture, if Diff_X>0 && Diff_Y<=0, a right part of the block is outside the picture, if Diff_X>0 && Diff_Y<=0, a bottom part of the block is outside the picture, otherwise a right part and a bottom part of the block are outside the picture.

In the case the current block is partly outside the picture, the method continues at step S230 otherwise the method continues at step S240. In this latter case, the block is completely inside the picture and all split modes may be allowed. In particular cases, some of the split modes may be disallowed for blocks completely inside the picture. For example, if the width of the block is equal to the minimum width authorized for a block (e.g. 4 pixels), then the vertical split modes are disallowed. In the same way, if the height of the block is equal to the minimum height authorized for a block (e.g. 4 pixels), then the horizontal split modes are disallowed. In addition, some of the split modes may be disabled by high level syntax elements, e.g. for some specific profiles. In this latter case, the disabled split modes are disallowed for all blocks of the image or for possibly all blocks of a video. In the specific case where the current block is outside the picture horizontally and vertically as for example the bottom right block in FIG. 6, then no split modes is allowed except the QT_SPLIT mode.

At step S230, the receiver determines for each split mode of a plurality of split modes whether the current block is allowed to undergo splitting according to this split mode by checking whether at least one of the split lines is co-located with one of the picture borders. In an exemplary embodiment, the plurality of split modes comprises the following split modes: HOR_UP, HOR_DOWN, HOR_TRIPLE, HOR, VER_TRIPLE, VER, VER_LEFT, VER_RIGHT. Usually but not necessarily, the split modes other than QT_SPLIT mode are looked into only when splitting according to the QT_SPLIT mode is decided. In a variant, the plurality of split modes comprises a subset of the split modes listed previously. With the introduction of triple split modes or asymmetric binary split modes, many different splits may be available to reach the picture border. In this embodiment, an asymmetric binary split mode is allowed at a border of a picture for a current block if the split line is exactly on the picture border. A triple split mode is allowed at a border of a picture for a current block if the first split line or second split line is exactly on the frame border.

In a specific embodiment, the split modes allowed are as specified below.

The mode NO_SPLIT is allowed only in the case where the block is completely inside the picture, otherwise this mode is not allowed. A flag noSplitAllowed is set to 1 (or to true) to indicate that the NO_SPLIT mode is allowed.

The mode HOR is allowed if the block does not extend beyond the boundary of the picture at right (or at left depending on scanning order). In a variant, the mode HOR is allowed if the right part of the block does not extend beyond the boundary of the picture at right and, in the case where the block extends beyond the boundary of the picture at bottom, if the border of the picture and the horizontal split line resulting from a HOR splitting are co-located. In this case, a flag binaryHorAllowed is set to 1 to indicate that the corresponding split mode is allowed for the current block.

The mode VER is allowed if the block does not extend beyond the boundary of the picture at bottom (or at top depending on scanning order). In a variant, the mode VER is allowed if the block does not extend beyond the boundary of the picture at bottom and, in the case where the block extends beyond the boundary of the picture at right, if the border of the picture and the vertical split line resulting from a VER splitting are co-located.

In this case, a flag binaryVerAllowed is set to 1 to indicate that the corresponding split mode is allowed for the current block.

The mode HOR_TRIPLE is allowed if the block does not extend beyond the boundary of the picture at right and, in the case where the block extends beyond the boundary of the picture at bottom, if the border of the picture is co-located with one of the horizontal split lines resulting from a HOR_TRIPLE splitting, i.e. if blkPosY+height/4 is equal to frameHeight or if blkPosY+3*height/4 is equal to frameHeight. A flag horizontalTripleAllowed is set to 1 to indicate that the corresponding split mode is allowed for the current block.

The mode VER_TRIPLE is allowed if the block does not extend beyond the boundary of the picture at bottom and, in the case where the block extends beyond the boundary of the picture at right, if the border of the picture is co-located with one of the vertical split lines resulting from a VER_TRIPLE splitting, i.e. if blkPosX+width/4 is equal to frameWidth or if blkPosX+3*width/4 is equal to frameWidth. A flag verticalTripleAllowed is set to 1 to indicate that the corresponding split mode is allowed for the current block.

HOR_UP is allowed if the block does not extend beyond the boundary of the picture at right and, in the case where the block extends beyond the boundary of the picture at bottom, if the border of the picture is co-located with the horizontal split line resulting from a HOR_UP splitting, i.e. if blkPosY+height/4 is equal to frameHeight. A flag horUpAllowed is set to 1 to indicate that the corresponding split mode is allowed for the current block.

HOR_DOWN is allowed if the block does not extend beyond the boundary of the picture at right and, in the case where the block extends beyond the boundary of the picture at bottom, if the border of the picture is co-located with the horizontal split line resulting from a HOR_DOWN splitting, i.e. if blkPosY+3*height/4 is equal to frameHeight. A flag horDownAllowed is set to 1 to indicate that the corresponding split mode is allowed for the current block.

VER_LEFT is allowed if the block does not extend beyond the boundary of the picture at bottom and, in the case where the block extends beyond the boundary of the picture at right, if the border of the picture is co-located with the vertical split line resulting from a VER_LEFT splitting, i.e. if blkPosX+width/4 is equal to frameWidth. A flag verLeftAllowed is set to 1 to indicate that the corresponding split mode is allowed for the current block.

VER_RIGHT is allowed if the block does not extend beyond the boundary of the picture at bottom and, in the case where the block extends beyond the boundary of the picture at right, if the border of the picture is co-located with the vertical split line resulting from a VER_RIGHT splitting, i.e. if blkPosX+3*width/4 is equal to frameWidth. A flag verRightAllowed is set to 1 to indicate that the corresponding split mode is allowed for the current block.

In a variant, additional splitting constraints may be added to the above decisions of allowability.

If at least one of the HOR and HOR_TRIPLE split modes is allowed then horBinaryOrTripleAllowed flag is set to 1.

If at least one of the VER and VER_TRIPLE split modes is allowed then verBinaryOrTripleAllowed flag is set to 1.

If at least one of the vertical split modes is allowed then verticalSplitAllowed flag is set to 1. If at least one of the horizontal split modes is allowed then horizontalSplitAllowed flag is set to 1.

If at least one of the asymmetric horizontal split modes is allowed then horizontalAsymmetricAllowed flag is set to 1.

If at least one of the asymmetric vertical split modes is allowed then verticalAsymmetricAllowed flag is set to 1.

At step S240, the receiver decodes from the accessed bitstream a current split mode for the current block responsive to the allowed split modes determined at step S230. Indeed, knowing the allowed modes for a current block makes it possible to simplify the signaling and thus saving bits. An example is provided by the syntax in Table 1 in connection with FIG. 12. In table 1 and FIG. 12, by convention the value true is equal to 1 and the value false is equal to 0. Consequently, a syntax element being true is the same as the syntax element being equal to 1 and a syntax element being false is the same as the syntax element being equal to 0. In table 1, the syntax elements decoded from the bitstream are indicated in bold.

```
bt_split_mode(x0,y0,width,height,cqtDepth){
   if(btSplitAllowed(x0,y0,width,height) && noSplitAllowed){
      btSplitFlag
   }
   if(btSplitFlag==true){
      if(horizontalSplitAllowed && verticalSplitAllowed){
         btSplitOrientation
      }
      if(btSplitOrientation==OrientationHOR){
         if(horizontalAsymmetricAllowed &&
            horBinaryOrTripleAllowed){
               asymmetricSplitFlag
         }
         if(asymmetricSplitFlag==true && horUpAllowed &&
horDownAllowed){
            horizontalAsymmetricType
         }
         else if(asymmetricSplitFlag==false && horizontalTripleAllowed
&& binaryHorAllowed){
            horizontalTripleFlag
         }
      }else if (btSplitOrientation==OrientationVER) {
         if(verticalAsymmetricAllowed && verBinaryOrTripleAllowed){
               asymmetricSplitFlag
         }
         if(asymmetricSplitFlag==true && verLeftAllowed &&
verRightAllowed){
            verticalAsymmetricType
         }
         else if(asymmetricSplitFlag==false &&
verticalTripleAllowed && binaryVerAllowed){
            verticalTripleFlag
         }
      }
   }
}
```

Figure 12:
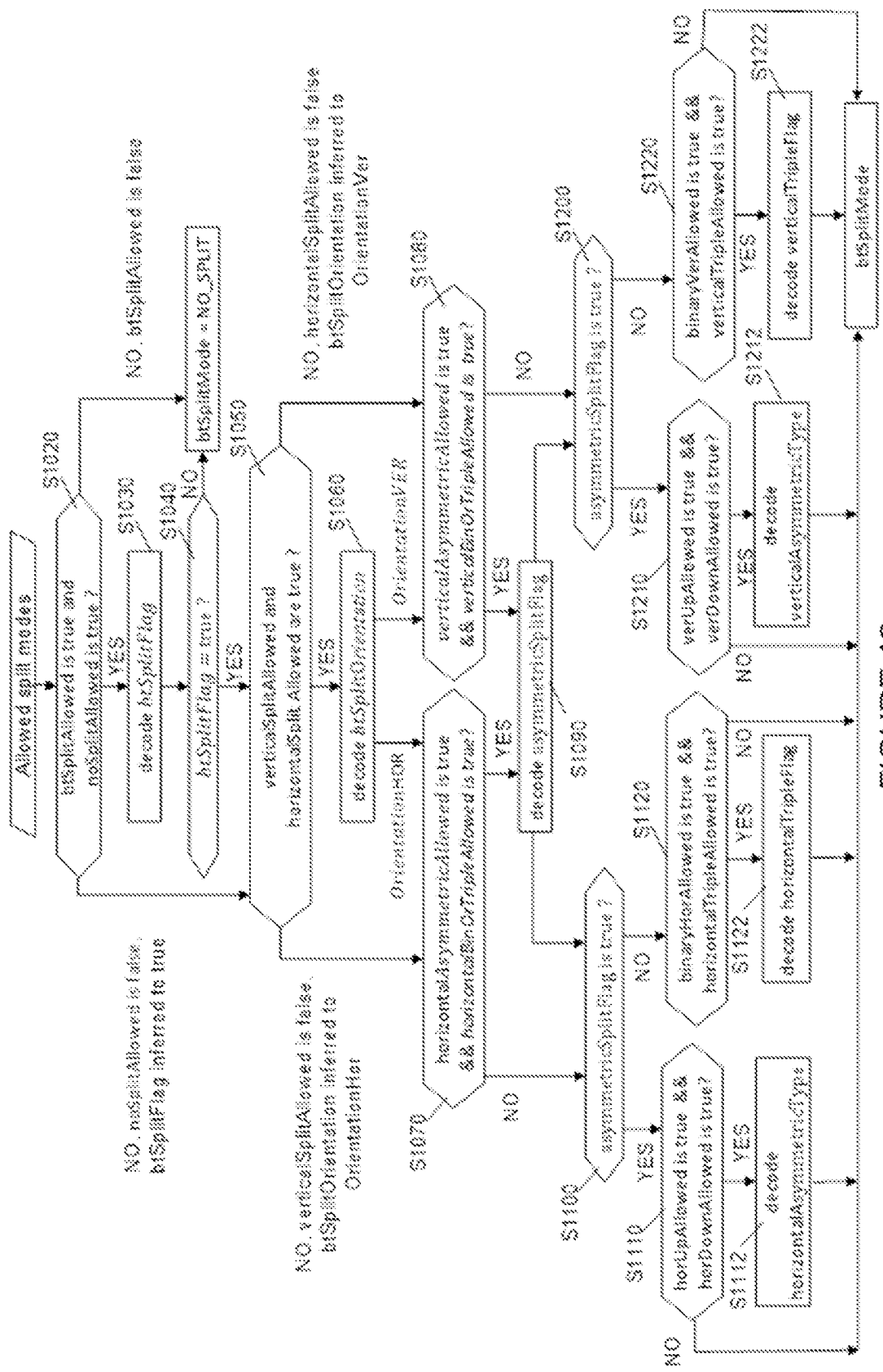
FIG. 12 represents a flowchart of a method for decoding a syntax according to a specific and non-limiting embodiment.

On FIG. 12 only the steps relating to the binary split mode decoding of a current block are represented.

At step S1020, the receiver checks whether binary or triple splittings and NO_SPLIT mode are allowed for the current block to be decoded. Checking whether binary/triple splitting is allowed (btSplitAllowed( )) typically consists in checking if the current block width (w) or the current block height (h) is higher than a threshold (minBTSize). A typical minimum rectangular block size in width or height is minBTSize=4.

If the binary/triple splitting is not allowed, the block is not split (btSplitMode is set to NO_SPLIT at step S1045) and no other syntax element related to the splitting is decoded. If both binary splitting and NO_SPLIT mode are allowed, a flag btSplitFlag is decoded from the bitstream at step S1030 that indicates if the current block is split or not.

Otherwise (if binary/triple splitting is allowed and the NO_SPLIT mode is not allowed), the btSplitFlag is not decoded and is inferred to be equal to 1 (or true) and the method continues at step S1050. For a current block that extends partially beyond the boundaries of the picture, the NO_SPLIT mode is not allowed, therefore the btSplitFlag is not decoded and is inferred to be equal to 1.

At step S1040, the receiver checks whether the current block is split or not. If the current block is not split (e.g. btSplitFlag is False at step S1040), then no other syntax element related to the splitting is decoded. btSplitMode is set to NO_SPLIT at step S1045.

In the case where the current block is split (btSplitFlag is True at step S1040), the receiver determines at step S1050 whether both horizontal and vertical split modes are allowed for the current block. If both horizontal and vertical split modes are allowed, a syntax element (btSplitOrientation) is decoded at step S1060 to indicate the binary splitting orientation (horizontal or vertical). If either horizontal or vertical splitting is not allowed, then this syntax element (btSplitOrientation) is not decoded. In this latter case, the binary splitting orientation is inferred. If horizontal splitting is not allowed (horizontalSplitAllowed is equal to 0 or False), then the btSplitOrientation is inferred to be equal to OrientationVER. Otherwise, if vertical splitting is not allowed (verticalSplitAllowed is equal to 0 or False), the btSplitOrientation is inferred to be equal to Orientation-HOR.

Then, the receiver checks at step S1070 if both flags horizontalAsymmetricAllowed and horizontalBinOrTripleAllowed are true. If both flags are true then a syntax element (asymmetricSplitFlag) is decoded at step S1090 and the method continues at step S1100. If horizontalAsymmetricAllowed is true and horizontalBinOrTripleAllowed is false, asymmetricSplitFlag is inferred to be equal to true and the method continues at step S1100. Otherwise (horizontalAsymmetricAllowed is false and horizontalBinOrTripleAllowed is true), asymmetricSplitFlag is inferred to be equal to false and the method continues at step S1100.

At step S1100, the receiver checks whether the flag asymmetricSplitFlag is true or false. If asymmetricSplitFlag is true, then the method continues at step S1110, else the method continues at step S1120.

At step S1110, the receiver checks if both flags horUpAllowed and horDownAllowed are true. If both flags are true, then a syntax element horizontalAsymmetricType is decoded at step S1112, otherwise (if one of the flags is false), then the split mode of the block is inferred to HOR_UP if horDownAllowed is false or to HOR_DOWN if horUpAllowed is false.

At step S1120, the receiver checks if both flags binaryHorAllowed and horizontalTripleAllowed are true. If both flags are true, then a syntax element horizontalTripleFlag is decoded at step S1122, otherwise (if one of the flags is false), then the split mode of the block is inferred to HOR_TRIPLE if binaryHorAllowed is false or to HOR if horizontalTripleAllowed is false.

The receiver proceeds the same way for the vertical orientation.

The receiver checks at step S1080 if both flags verticalAsymmetricAllowed and verticalBinOrTripleAllowed are true. If both flags are true then a syntax element (asymmetricSplitFlag) is decoded at step S1090 and the method continues at step S1200. If verticalAsymmetricAllowed is true and verticalBinOrTripleAllowed is false, asymmetricSplitFlag is inferred to be equal to true and the method continues at step S1200. Otherwise (verticalAsymmetricAllowed is false and verticalBinOrTripleAllowed is true), asymmetricSplitFlag is inferred to be equal to false and the method continues at step S1200.

At step S1200, the receiver checks whether the flag asymmetricSplitFlag is true or false. If asymmetricSplitFlag is true, then the method continues at step S1210, else the method continues at step S1220.

At step S1210, the receiver checks if both flags verLeftAllowed and verRightAllowed are true. If both flags are true, then a syntax element verticalAsymmetricType is decoded at step S1212, otherwise (if one of the flags is false), then the split mode btSplitMode of the block is inferred to VER_LEFT if verRightAllowed is false or to VER_RIGHT if verLeftAllowed is false.

At step S1220, the receiver checks if both flags binaryVerAllowed and verticalTripleAllowed are true. If both flags are true, then a syntax element verticalTripleFlag is decoded at step S1222, otherwise (if one of the flags is false), then the split mode btSplitMode of the block is inferred to VER_TRIPLE if binaryVerAllowed is false or to VER if verticalTripleAllowed is false.

Figure 13:
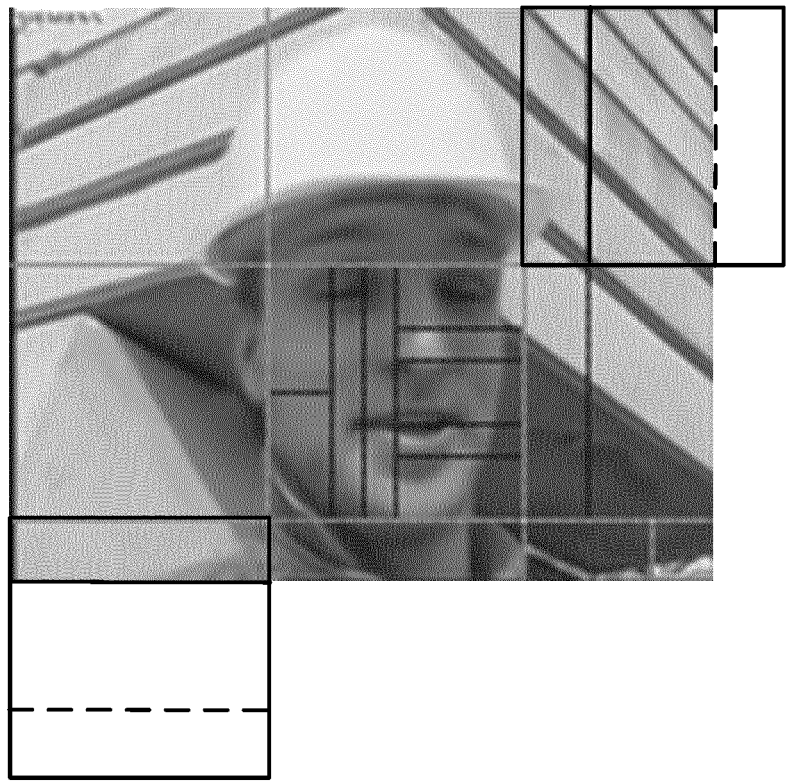
FIG. 13 represents splitting of blocks that extend beyond the picture boundaries.
Figure 14:
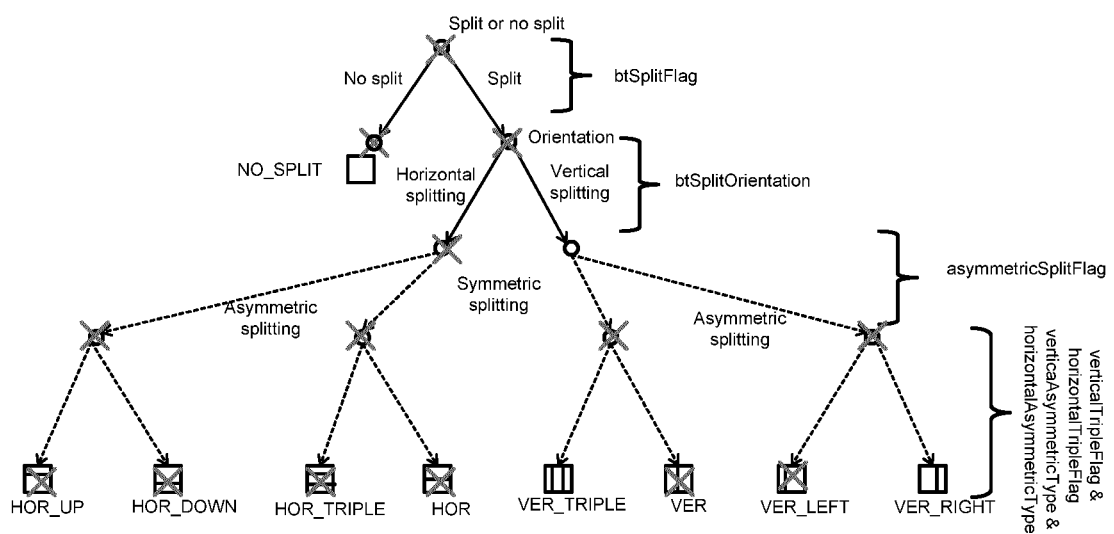
FIGS. 14 and 15 illustrate the pruning of the syntax.
Figure 15:
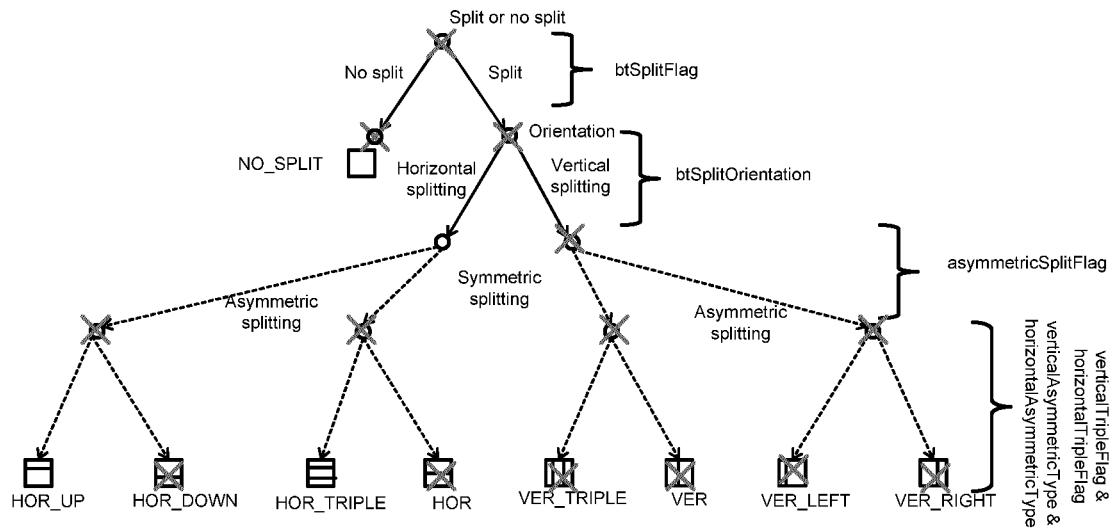

As an example, for the top right block of FIG. 13, binary tree syntax can be pruned as depicted on FIG. 14 to remove unnecessary splits. In this example only VER_TRIPLE and VER_RIGHT are allowed, so only one flag asymmetricSplitFlag is needed to decode the split. In the same way as depicted on FIG. 15, for the bottom left block of FIG. 13, binary tree syntax can be pruned to remove unnecessary splits. In this example only HOR_TRIPLE and HOR_UP are available. These two split modes give the same partition for the bottom left block, so one of the two splits can be removed. More generally, in case where two different split modes give the same partition of the block, only one is allowed. FIGS. 14 and 15 are graphic representations of the syntax as defined in table 1. The method according to the present principles thus enable competition between Quad Tree splitting and Binary/Triple splitting at the border of the picture with improved rate distortion performance.

Figure 16:
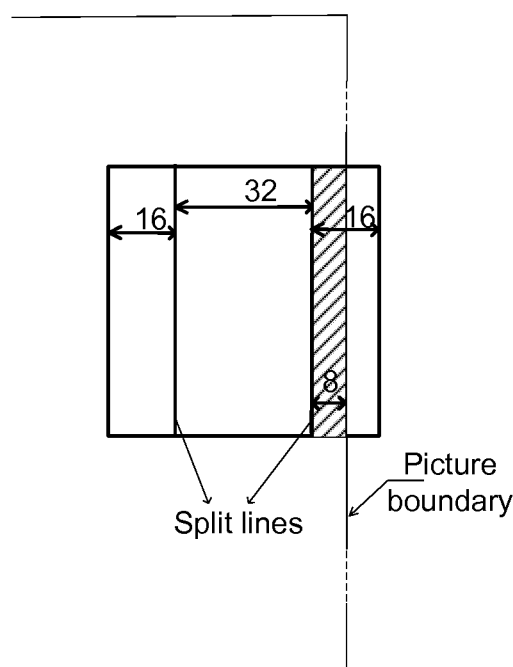
FIG. 16 represents splitting of blocks that extend beyond the picture boundaries.

In a first variant of step S230, the receiver determines whether said current block is allowed to undergo splitting according to at least one split mode of a plurality of split modes by checking whether the size (i.e. the width in case of vertical split or the height in case of horizontal split) of the remaining part of the block after splitting is a multiple of the minimum block size (typically 4 pixels). This embodiment may be combined with the previous embodiment. The remaining part is the part of the block, i.e. the sub-block resulting from the splitting, located inside the picture along a picture's boundary. As an example, in a first step, it is checked whether the border of the picture is co-located with one of the split lines, if not then it is checked whether the size (width in case of vertical split or height in case of horizontal split) of the remaining part after splitting is a multiple of the minimum block size. In this embodiment the triple split modes can be used even when the border of the picture is not co-located with one of the split lines. In FIG. 16, a block of 64×64 is split vertically with a left part of 16×64, a central part of 32×64 and a remaining right part of size 8×64 that is identified by a hatched block.

Equivalently, an asymmetric binary split is allowed if a size (width in case of vertical split or height in case of horizontal split) of the remaining part along the boundary of the picture is still a multiple of the minimum block size (for example 4).

This second embodiment may be advantageously combined with the first embodiment as disclosed below.

The mode NO_SPLIT is allowed only in the case where the block is completely inside the picture, otherwise this mode is not allowed. A flag noSplitAllowed is set to 1 to indicate that the NO_SPLIT mode is allowed.

The mode HOR is allowed if the block does not extend beyond the boundary of the picture at right. In a variant, the mode HOR is allowed if the right part of the block does not extend beyond the boundary of the picture at right and, in the case where the block extends beyond the boundary of the picture at bottom, if the border of the picture and the horizontal split line resulting from a HOR splitting are co-located or if the height of the remaining part of the block after splitting is a multiple of the minimum block size. In this case, a flag binaryHorAllowed is set to 1 to indicate that the corresponding split mode is allowed for the current block.

The mode VER is allowed if the block does not extend beyond the boundary of the picture at bottom. In a variant, the mode VER is allowed if the block does not extend beyond the boundary of the picture at bottom and, in the case where the block extends beyond the boundary of the picture at right, if the border of the picture and the vertical split line resulting from a VER splitting are co-located or if the width of the remaining part of the block after splitting is a multiple of the minimum block size. In this case, a flag binaryVerAllowed is set to 1 to indicate that the corresponding split mode is allowed for the current block.

The mode HOR_TRIPLE is allowed if the block does not extend beyond the boundary of the picture at right and, in the case where the block extends beyond the boundary of the picture at bottom, if the border of the picture is co-located with one of the horizontal split lines resulting from a HOR_TRIPLE splitting, i.e. if blkPosY+height/4 is equal to frameHeight or if blkPosY+3*height/4 is equal to frameHeight, or if the height of the remaining part of the block after splitting is a multiple of the minimum block size. A flag horizontalTripleAllowed is set to 1 to indicate that the corresponding split mode is allowed for the current block.

The mode VER_TRIPLE is allowed if the block does not extend beyond the boundary of the picture at bottom and, in the case where the block extends beyond the boundary of the picture at right, if the border of the picture is co-located with one of the vertical split lines resulting from a VER_TRIPLE splitting, i.e. if blkPosX+width/4 is equal to frameWidth or if blkPosX+3*width/4 is equal to frameWidth, or if the width of the remaining part of the block after splitting is a multiple of the minimum block size. A flag verticalTripleAllowed is set to 1 to indicate that the corresponding split mode is allowed for the current block.

HOR_UP is allowed if the block does not extend beyond the boundary of the picture at right and, in the case where the block extends beyond the boundary of the picture at bottom, if the border of the picture is co-located with the horizontal split line resulting from a HOR_UP splitting, i.e. if blkPosY+height/4 is equal to frameHeight, or if the height of the remaining part of the block after splitting is a multiple of the minimum block size. A flag horUpAllowed is set to 1 to indicate that the corresponding split mode is allowed for the current block.

HOR_DOWN is allowed if the block does not extend beyond the boundary of the picture at right and, in the case where the block extends beyond the boundary of the picture at bottom, if the border of the picture is co-located with the horizontal split line resulting from a HOR_DOWN splitting, i.e. if blkPosY+3*height/4 is equal to frameHeight, or if the height of the remaining part of the block after splitting is a multiple of the minimum block size. A flag horDownAllowed is set to 1 to indicate that the corresponding split mode is allowed for the current block.

VER_LEFT is allowed if the block does not extend beyond the boundary of the picture at bottom, and in the case where the block extends beyond the boundary of the picture at right, if the border of the picture is co-located with the vertical split line resulting from a VER_LEFT splitting, i.e. if blkPosX+width/4 is equal to frameWidth, or if the width of the remaining part of the block after splitting is a multiple of the minimum block size. A flag verLeftAllowed is set to 1 to indicate that the corresponding split mode is allowed for the current block.

VER_RIGHT is allowed if the block does not extend beyond the boundary of the picture at bottom, and in the case where the block extends beyond the boundary of the picture at right, if the border of the picture is co-located with the vertical split line resulting from a VER_RIGHT splitting, i.e. if blkPosX+3*width/4 is equal to frameWidth, or if the width of the remaining part of the block after splitting is a multiple of the minimum block size. A flag verRightAllowed is set to 1 to indicate that the corresponding split mode is allowed for the current block.

In a second variant of S230, if a current block extends partly beyond the boundary of the picture, the size of the remaining part of the current block is computed. It is then checked if transforms (e.g. DCT or DST) are available to transform the remaining part into a block of coefficients. If such transforms are available, the current block may be encoded without further splitting. In this case, the split mode NO_SPLIT is indicated as allowed by setting the flag noSplitAllowed equal to 1. In this latter case, a flag is decoded to indicate whether the block is effectively not split or if the block is further split according to a split mode, e.g. as a quad tree. In a specific embodiment, the other split modes either binary or triple are disallowed for such a block. In a variant, all these split modes are allowed in addition to the quad-tree split mode.

As an example, for a current block of size 16×16 with a remaining part of size 4×16, the NO_SPLIT is allowed for the current block since a block of size 4×16 may be transformed with 1D transforms of size 4 and 16. In this second variant, the NO_SPLIT mode may thus be allowed even for a block that extends beyond the boundary of the picture.

In another example, for a current block of size 16×16 with a remaining part of size 12×16, the NO_SPLIT is allowed for the current block only in the case where asymmetric splitting is enabled. Indeed, in this case the 12×16 block may be transformed by transforms of size 3×2N. Such transforms of size 3×2N are available in the case where asymmetric splitting is enabled. In the case where asymmetric splitting is disabled, only power of 2 transforms are available. In this latter case, the block 12×16 is necessarily split, i.e. the NO_SLPIT mode is thus disallowed. Asymmetric splitting may be disabled by a high level syntax element, e.g. for some profiles.

At step S250, the current block is decoded according to the current split mode. To this aim, each sub-block of the block obtained by splitting the current block according to the split mode is decoded.

Decoding a block, e.g. one of the sub-blocks of the current block, usually but not necessarily comprises entropy decoding a portion of the bitstream representative of the block to obtain a block of transform coefficients, de-quantizing and inverse transforming the block of transform coefficients to obtain a block of residuals and adding a predictor to the block of residuals to obtain a decoded block.

FIG. 17 represents a flowchart of a method for encoding a block of a picture in a bitstream according to a specific and non-limiting embodiment.

The method starts at step S100. At step S110, a transmitter, e.g. such as the encoder 100, accesses a current block that includes at least a portion of a picture. At step S120, the transmitter determines whether the current block is partly outside the picture, i.e. extends beyond one boundary of the picture. This step is identical to the step S220 of the decoding method.

In the case where the current block is partly outside the picture, the method continues at step S130 otherwise the method continues at step S140. In this latter case, the block is completely inside the picture and all split modes may be allowed. At step S130, the transmitter determines for each split mode of a plurality of split modes whether the current block is allowed to undergo splitting according to this split mode by checking whether at least one of the split line is co-located with one of the picture border. This step is identical to the step S230 of the decoding method. All the embodiments and variants disclosed with respect to the decoding method also apply to the encoding method. At step S140, the transmitter determines a current split mode for the accessed block responsive to the allowed split modes and encodes, for the current block, the current split mode in a bitstream. The split mode may be selected among the allowed mode based on a rate-distortion criteria. Each allowed split mode may be tested and the one offering the best rate-distortion compromise is selected as the split mode to encode the current block.

At step S150, the transmitter encodes the accessed block into the bitstream according to the current split mode. To this aim, the current block may be split into several sub-blocks according the split mode. Encoding a block, e.g. a sub-block, usually but not necessarily comprises subtracting a predictor from the block to obtain a block of residuals, transforming the block of residuals into a block of transform coefficients, quantizing the block of coefficients with a quantization step size QP to obtain a quantized block of transform coefficients and entropy coding the quantized block of transform coefficients in the bitstream. Reconstructing a block on the encoder side usually but not necessarily comprises de-quantizing and inverse transforming the quantized block of transform coefficients to obtain a block of residuals and adding the predictor to the block of residuals to obtain a decoded block.

The method ends at step S180.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A decoding method, comprising:
 obtaining a current block;
 determining a current split mode to be applied to the current block in a set of split modes, each split mode of the set of split modes specifying a single decomposition of a first block into a plurality of second blocks, each second block having a width equal to a width of the first block or corresponding to a predefined sub-division of the width of the first block and a height equal to a height of the first block or corresponding to a predefined sub-division of the height of the first block; and
 decoding the current block according to the determined current split mode,
 wherein, responsive to the current block extending beyond a single boundary of the picture, determining the current split mode comprises:
  decoding information to identify the current split mode in a plurality of split modes for which a split direction is parallel to a direction of the single boundary of the picture,
  wherein the information comprises a flag indicating a number of second blocks resulting from a decomposition of the current block according to the current split mode, and wherein the set of split modes comprises the plurality of split modes.

2. The decoding method according to claim 1,
wherein h is a height of a first block and w is a width of the first block, and
wherein the plurality of split modes comprises at least two of the following split modes:
  splitting the first block horizontally into one upper second block of height h/4 and one bottom second block of height 3h/4;
  splitting the first block horizontally into one bottom second block of height h/4 and one upper second block of height 3h/4;
  splitting the first block vertically into one left second block of width w/4 and one right second block of width 3w/4;
  splitting the first block vertically into one right second block of width w/4 and one left second block of width 3w/4;
  splitting the first block horizontally into one upper second block of height h/4, one central second block of height h/2 and one bottom second block of height h/4;
  splitting the first block vertically into one left second block of width w/4, one central second block of width w/2 and one right second block of width w/4;
  splitting the first block horizontally into two second blocks of height h/2; and
  splitting the first block vertically into two second blocks of width w/2.

3. The decoding method according to claim 1, wherein splitting the current block horizontally into two sub-blocks of height h/2 is allowed if the current block does not extend beyond the boundary of the picture at right or at left and splitting the current block vertically into two sub-blocks of width w/2 is allowed if the current block does not extend beyond the boundary of the picture at bottom or at top.

4. An encoding method, comprising:
  obtaining a current block;
  determining a current split mode to be applied to the current block in a set of split modes, each split mode of the set of split modes specifying a single decomposition of a first block into a plurality of second blocks, each second block having a width equal to a width of the first block or corresponding to a predefined sub-division of the width of the first block and a height equal to a height of the first block or corresponding to a predefined sub-division of the height of the first block; and
  encoding the current block in video data according to the determined current split mode,
  wherein, responsive to the current block extending beyond a single boundary of the picture, determining the current split mode comprises:
    selecting the current split mode from a plurality of split modes for which a split direction is parallel to a direction of the single boundary of the picture,
    wherein the set of split modes comprises the plurality of split modes; and
  wherein encoding the current block in the video data comprises encoding information to identify the current split mode, and
  wherein the information comprises a flag indicating a number of second blocks resulting from a decomposition of the current block according to the current split mode.

5. The encoding method according to claim 4,
wherein h is a height of a first block and w is a width of the first block, and
wherein the plurality of split modes comprises at least two of the following split modes:
  splitting the first block horizontally into one upper second block of height h/4 and one bottom second block of height 3h/4;
  splitting the first block horizontally into one bottom second block of height h/4 and one upper second block of height 3h/4;
  splitting the first block vertically into one left second block of width w/4 and one right second block of width 3w/4;
  splitting the first block vertically into one right second block of width w/4 and one left second block of width 3w/4;
  splitting the first block horizontally into one upper second block of height h/4, one central second block of height h/2 and one bottom second block of height h/4;
  splitting the first block vertically into one left second block of width w/4, one central second block of width w/2 and one right second block of width w/4;
  splitting the first block horizontally into two second blocks of height h/2; and
  splitting the first block vertically into two second blocks of width w/2.

6. The encoding method according to claim 4, wherein splitting the current block horizontally into two sub-blocks of height h/2 is allowed if the current block does not extend beyond the boundary of the picture at right or at left and splitting the current block vertically into two sub-blocks of width w/2 is allowed if the current block does not extend beyond the boundary of the picture at bottom or at top.

7. A decoding apparatus, comprising electronic circuitry configured to:
  obtain a current block;
  determine a current split mode to be applied to the current block in a set of split modes, each split mode of the set of split modes specifying a single decomposition of a first block into a plurality of second blocks, each second block having a width equal to a width of the first block or corresponding to a predefined sub-division of the width of the first block and a height equal to a height of the first block or corresponding to a predefined sub-division of the height of the first block; and
  decode the current block according to the determined current split mode,
  wherein, responsive to the current block extending beyond a single boundary of the picture, determining the current split mode comprises:
    decoding information to identify the current split mode in a plurality of split modes for which a split direction is parallel to a direction of the single boundary of the picture,
    wherein the information comprises a flag indicating a number of second blocks resulting from a decomposition of the current block according to the current split mode, and
    wherein the set of split modes comprises the plurality of split modes.

8. The decoding apparatus according to claim 7,
wherein h is a height of a first block and w is a width of the first block, and
wherein the plurality of split modes comprises at least two of the following split modes:

splitting the first block horizontally into one upper second block of height h/4 and one bottom second block of height 3h/4;
splitting the first block horizontally into one bottom second block of height h/4 and one upper second block of height 3h/4;
splitting the first block vertically into one left second block of width w/4 and one right second block of width 3w/4;
splitting the first block vertically into one right second block of width w/4 and one left second block of width 3w/4;
splitting the first block horizontally into one upper second block of height h/4, one central second block of height h/2 and one bottom second block of height h/4;
splitting the first block vertically into one left second block of width w/4, one central second block of width w/2 and one right second block of width w/4;
splitting the first block horizontally into two second blocks of height h/2; and
splitting the first block vertically into two second blocks of width w/2.

9. The decoding apparatus according to claim 7, wherein splitting the current block horizontally into two sub-blocks of height h/2 is allowed if the current block does not extend beyond the boundary of the picture at right or at left and splitting the current block vertically into two sub-blocks of width w/2 is allowed if the current block does not extend beyond the boundary of the picture at bottom or at top.

10. An encoding apparatus, comprising electronic circuitry configured to:
obtain a current block;
determine a current split mode to be applied to the current block in a set of split modes, each split mode of the set of split modes specifying a single decomposition of a first block into a plurality of second blocks, each second block having a width equal to a width of the first block or corresponding to a predefined sub-division of the width of the first block and a height equal to a height of the first block or corresponding to a predefined sub-division of the height of the first block; and
encode the current block in video data according to the determined current split mode,
wherein, responsive to the current block extending beyond a single boundary of the picture, determining the current split mode comprises:
selecting the current split mode from a plurality of split modes for which a split direction is parallel to a direction of the single boundary of the picture,
wherein the set of split modes comprises the plurality of split modes; and
wherein encoding the current block in the video data comprises encoding information to identify the current split mode, and
wherein the information comprises a flag indicating a number of second blocks resulting from a decomposition of the current block according to the current split mode.

11. The encoding apparatus according to claim 10, wherein h is a height of a first block and w is a width of the first block, and
wherein the plurality of split modes comprises at least two of the following split modes:
splitting the first block horizontally into one upper second block of height h/4 and one bottom second block of height 3h/4;
splitting the first block horizontally into one bottom second block of height h/4 and one upper second block of height 3h/4;
splitting the first block vertically into one left second block of width w/4 and one right second block of width 3w/4;
splitting the first block vertically into one right second block of width w/4 and one left second block of width 3w/4;
splitting the first block horizontally into one upper second block of height h/4, one central second block of height h/2 and one bottom second block of height h/4;
splitting the first block vertically into one left second block of width w/4, one central second block of width w/2 and one right second block of width w/4;
splitting the first block horizontally into two second blocks of height h/2; and
splitting the first block vertically into two second blocks of width w/2.

12. The encoding apparatus according to claim 10, wherein splitting the current block horizontally into two sub-blocks of height h/2 is allowed if the current block does not extend beyond the boundary of the picture at right or at left and splitting the current block vertically into two sub-blocks of width w/2 is allowed if the current block does not extend beyond the boundary of the picture at bottom or at top.

13. A non-transitory machine-readable medium having stored thereon machine executable instructions operative, when executed by at least one processor, to cause the at least one processor to:
obtain a current block;
determine a current split mode to be applied to the current block in a set of split modes, each split mode of the set of split modes specifying a single decomposition of a first block into a plurality of second blocks, each second block having a width equal to a width of the first block or corresponding to a predefined sub-division of the width of the first block and a height equal to a height of the first block or corresponding to a predefined sub-division of the height of the first block; and
decode the current block according to the determined current split mode,
wherein, responsive to the current block extending beyond a single boundary of the picture, determining the current split mode comprises:
decoding information to identify the current split mode in a plurality of split modes for which a split direction is parallel to a direction of the single boundary of the picture,
wherein the information comprises a flag indicating a number of second blocks resulting from a decomposition of the current block according to the current split mode, and
wherein the set of split modes comprises the plurality of split modes.

14. The non-transitory machine-readable medium according to claim 13,
wherein h is a height of a first block and w is a width of the first block, and
wherein the plurality of split modes comprises at least two of the following split modes:
splitting the first block horizontally into one upper second block of height h/4 and one bottom second block of height 3h/4;

splitting the first block horizontally into one bottom second block of height h/4 and one upper second block of height 3h/4;

splitting the first block vertically into one left second block of width w/4 and one right second block of width 3w/4;

splitting the first block vertically into one right second block of width w/4 and one left second block of width 3w/4;

splitting the first block horizontally into one upper second block of height h/4, one central second block of height h/2 and one bottom second block of height h/4;

splitting the first block vertically into one left second block of width w/4, one central second block of width w/2 and one right second block of width w/4;

splitting the first block horizontally into two second blocks of height h/2; and splitting the first block vertically into two second blocks of width w/2.

15. A non-transitory machine-readable medium having stored thereon machine executable instructions operative, when executed by at least one processor, to cause the at least one processor to:
obtain a current block;
determine a current split mode to be applied to a current block in the set of split modes, each split mode of the set of split modes specifying a single decomposition of a first block into a plurality of second blocks, each second block having a width equal to a width of the first block or corresponding to a predefined sub-division of the width of the first block and a height equal to a height of the first block or corresponding to a predefined sub-division of the height of the first block; and
encode the current block in video data according to the determined current split mode,
wherein, responsive to the current block extending beyond a single boundary of the picture, determining the current split mode comprises:
selecting the current split mode from a plurality of split modes for which a split direction is parallel to a direction of the single boundary of the picture,
wherein the set of split modes comprises the plurality of split modes; and
wherein encoding the current block in the video data comprises encoding information to identify the current split mode, and
wherein the information comprises a flag indicating a number of second blocks resulting from a decomposition of the current block according to the current split mode.

16. The non-transitory machine-readable medium according to claim 15,
wherein h is a height of a first block and w is a width of the first block, and
wherein the plurality of split modes comprises at least two of the following split modes:
splitting the first block horizontally into one upper second block of height h/4 and one bottom second block of height 3h/4;
splitting the first block horizontally into one bottom second block of height h/4 and one upper second block of height 3h/4;
splitting the first block vertically into one left second block of width w/4 and one right second block of width 3w/4;

splitting the first block vertically into one right second block of width w/4 and one left second block of width 3w/4;

splitting the first block horizontally into one upper second block of height h/4, one central second block of height h/2 and one bottom second block of height h/4;

splitting the first block vertically into one left second block of width w/4, one central second block of width w/2 and one right second block of width w/4;

splitting the first block horizontally into two second blocks of height h/2; and splitting the first block vertically into two second blocks of width w/2.

17. An apparatus, the apparatus comprising:
at least one processor; and
a memory, the memory storing instructions operative, when executed by the at least one processor, to cause the apparatus to:
obtain a current block;
determine a current split mode to be applied to a current block in the set of split modes, each split mode of the set of split modes specifying a single decomposition of a first block into a plurality of second blocks, each second block having a width equal to a width of the first block or corresponding to a predefined sub-division of the width of the first block and a height equal to a height of the first block or corresponding to a predefined sub-division of the height of the first block; and
decode the current block according to the determined current split mode,
wherein, responsive to the current block extending beyond a single boundary of the picture, determining the current split mode comprises:
decoding information to identify the current split mode in a plurality of split modes for which a split direction is parallel to a direction of the single boundary of the picture,
wherein the information comprises a flag indicating a number of second blocks resulting from a decomposition of the current block according to the current split mode, and
wherein the set of split modes comprises the plurality of split modes.

18. The non-transitory medium according to claim 17,
wherein h is a height of a first block and w is a width of the first block, and
wherein the plurality of split modes comprises at least two of the following split modes:
splitting the first block horizontally into one upper second block of height h/4 and one bottom second block of height 3h/4;
splitting the first block horizontally into one bottom second block of height h/4 and one upper second block of height 3h/4;
splitting the first block vertically into one left second block of width w/4 and one right second block of width 3w/4;
splitting the first block vertically into one right second block of width w/4 and one left second block of width 3w/4;
splitting the first block horizontally into one upper second block of height h/4, one central second block of height h/2 and one bottom second block of height h/4;

splitting the first block vertically into one left second block of width w/4, one central second block of width w/2 and one right second block of width w/4;

splitting the first block horizontally into two second blocks of height h/2; and splitting the first block vertically into two second blocks of width w/2.

19. An apparatus, the apparatus comprising:

at least one processor; and a memory, the memory storing instructions operative, when executed by the at least one processor, to cause the apparatus to:

obtain a current block;

determine a current split mode to be applied to the current block in a set of split modes, each split mode of the set of split modes specifying a single decomposition of a first block into a plurality of second blocks, each second block having a width equal to a width of the first block or corresponding to a predefined sub-division of the width of the first block and a height equal to a height of the first block or corresponding to a predefined sub-division of the height of the first block; and encode the current block in video data according to a determined current split mode, wherein, responsive to the current block extending beyond a single boundary of the picture, determining the current split mode comprises:

selecting the current split mode from a plurality of split modes for which a split direction is parallel to a direction of the single boundary of the picture, wherein the set of split modes comprises the plurality of split modes; and wherein encoding the current block in the video data comprises encoding information to identify the current split mode, and wherein the information comprises a flag indicating a number of second blocks resulting from a decomposition of the current block according to the current split mode.

20. The non-transitory medium according to claim 19, wherein h is a height of a first block and w is a width of the first block, and wherein the plurality of split modes comprises at least two of the following split modes:

splitting the first block horizontally into one upper second block of height h/4 and one bottom second block of height 3h/4;

splitting the first block horizontally into one bottom second block of height h/4 and one upper second block of height 3h/4;

splitting the first block vertically into one left second block of width w/4 and one right second block of width 3w/4;

splitting the first block vertically into one right second block of width w/4 and one left second block of width 3w/4;

splitting the first block horizontally into one upper second block of height h/4, one central second block of height h/2 and one bottom second block of height h/4;

splitting the first block vertically into one left second block of width w/4, one central second block of width w/2 and one right second block of width w/4;

splitting the first block horizontally into two second blocks of height h/2; and splitting the first block vertically into two second blocks of width w/2.

* * * * *